June 27, 1967 D. M. HART 3,328,777

ELECTRON BEAM READOUT OF THERMOPLASTIC RECORDING

Filed April 27, 1964

INVENTOR.
DONALD M. HART
BY Elmer Galbi
ATTORNEY

1

3,328,777

ELECTRON BEAM READOUT OF THERMOPLASTIC RECORDING

Donald Mills Hart, Los Gatos, Calif., assignor to International Business Machines Corporation, New York, N.Y., a corporation of New York Filed Apr. 27, 1964, Ser. No. 362,613
9 Claims. (Cl. 340—173)

The present invention relates to information storage systems and in particular to information storage systems wherein information is stored in the form of deformation patterns.

The prior art shows information storage systems wherein information is stored in the form of deformation patterns on a thermoplastic material. For example, such an information storage system is shown in U.S. Patent 2,985,866, "Information Storage System," by J. F. Norton. In such systems, the information is read by optical means.

The present invention provides a system wherein information stored in the form of a deformation pattern is read with an electron beam. Furthermore, the information is stored using a modulated electron beam.

An object of the present invention is to provide an improved information storage system.

A further object of the present invention is to provide an information storage system wherein information stored in the form of a deformation pattern can be read using an electron beam.

Still another object of the present invention is to provide an improved information storage system wherein information stored in the form of a deformation pattern by a modulated electron beam can be read using an electron beam.

Yet another object of the present invention is to provide an information storage system wherein information stored in the form of a deformation pattern can be both written and read using an electron beam.

The information storage system of the present invention includes a layer of thermoplastic material disposed on an insulating substrate. The top of the thermoplastic material is coated with a thin conductive film. Information is stored by generating a pattern of electron charges on the insulated substrate and thereafter heating the thermoplastic material so that the thermoplastic material and the thin conductive coating is deformed due to the electrostatic forces generated by the charges on the insulating substrate. Information is read by directing an electron beam at the deformed thin conductive coating and using a device to detect the number of electrons which are backscattered. The number of electrons backscattered is a function of the particular orientation of the segment of the surface whereon the electron beam is incidented. Hence, by scanning the surface and detecting the number of backscattered electrons, one can detect any deformations in the surface.

The foregoing and other objects, features and advantages of the invention will be apparent from the following more particular description of preferred embodiments of the invention, as illustrated in the accompanying drawings.

2

Figures 1, 2, 3:
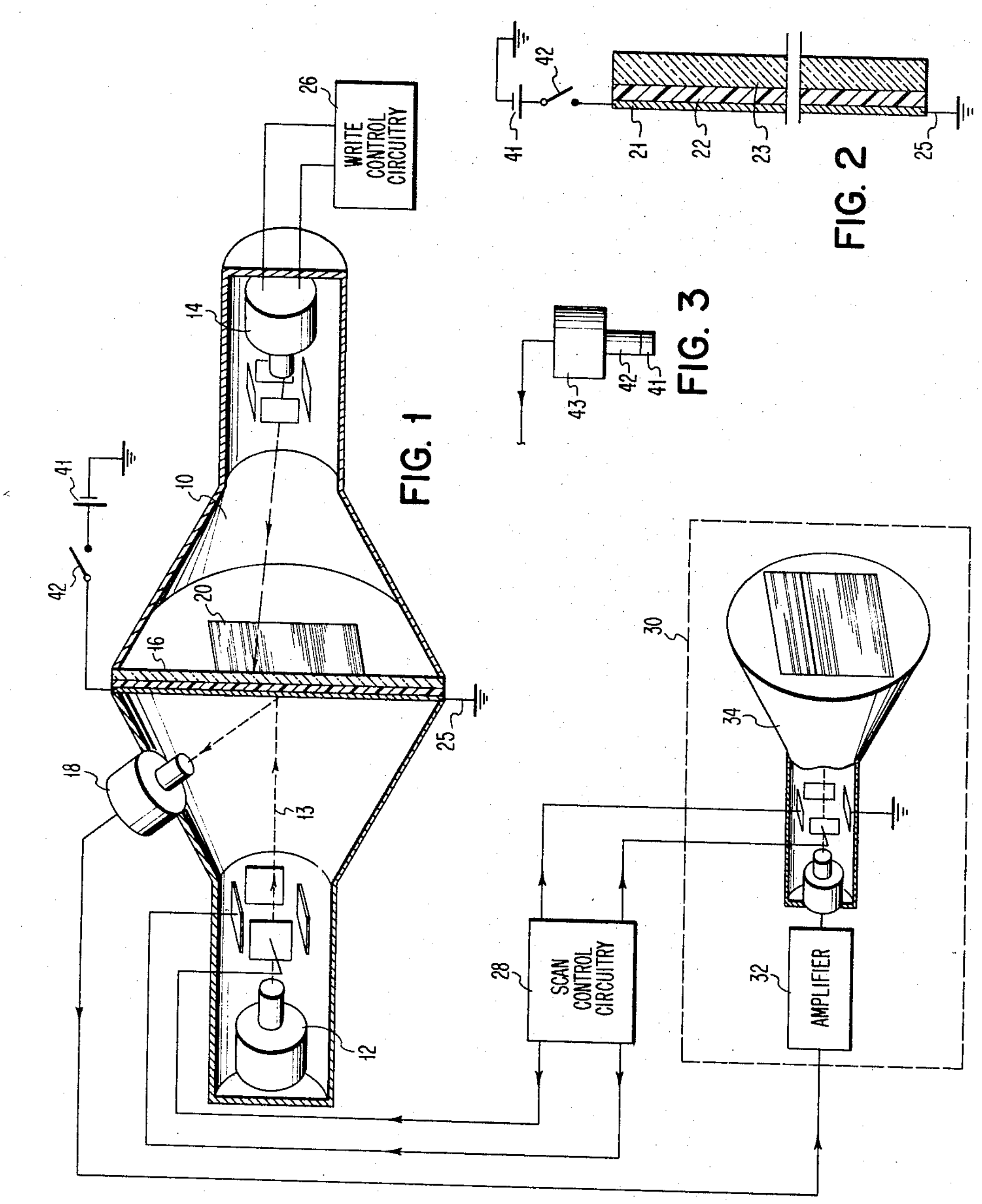
FIGURE 1 is an overall view of the system according to the present invention.
FIGURE 2 is an enlarged cross sectional view of the member whereon information is stored.
FIGURE 3 shows the details of the detector shown in FIGURE 1.

The first preferred embodiment of the invention shown in FIGURE 1 includes evacuated envelope 10 which has two electron guns 12 and 14 located in the ends thereof and a target 16 located in the center thereof. A detector 18 is located in the side of evacuated envelope 10. Information can be stored in information storage area 20 of target 16 in the form of a deformation pattern. The information can be written using electron gun 14 and read using electron gun 12. The information which is read is displayed on a display device 30.

FIGURE 2 shows a cross sectional view of information storage area 20. There are three layers respectively designated 21, 22 and 23. Layer 21 is located on the side of area 20 facing gun 12 and area 23 is located on the side of area 20 facing gun 14. Layer 21 is a thin coating of conductive material. Layer 22 is a layer of thermoplastic material, and layer 23 is a thin insulating substrate.

Information is stored in area 20 by depositing a pattern of electron charges on insulating layer 23 by means of electron gun 14. After the charges are deposited on layer 23, electric current is passed through conductive film 21 thereby heating conductive film 21 and the thermoplastic layer 22. The electrostatic charges on the surface of layer 23 create image charges in conductive film 21 and electrostatic forces are created between the charges in layer 23 and the image charges in layer 21. These electrostatic forces deform layers 21 and 22. Layers 21 and 22 are allowed to cool thereby permanently storing the information represented by the deformation pattern.

Information is read from area 20 by using electron gun 12. When electrons are directed at a particular spot on conductive layer 21, the percentage of electrons which are backscattered to detector 18 depends upon the orientation of the particular area. For example, the number of electrons backscattered to detector 18 is different if the electrons are directed at the bottom of a depression than it is if the electron beam is directed at the slanting sides of a depression. Conductive coating 21 and ground connection 25 provide a leakage path for electrons during the reading process so that a charge does not accumulate on the surface of film 21 during the reading operation.

Information is erased by first flooding layer 23 with a high energy electron beam such that the secondary emission ratio exceeds unity whereby any charge pattern on surface 23 is removed. Simultaneously with the flooding of substrate 23, electric current is passed through film 21 thereby heating film 21 and thermoplastic material 22. The surface tension forces in film 21 and thermoplastic material 22 eradicates any deformations previously there.

It is noted that during the writing operation, the electrons emitted by gun 14 must have a relatively high energy such that the secondary emission ratio is less than unity whereby a charge pattern can be created on the surface of layer 23. For example the writing gun could have an accelerating potential of ten thousand volts.

Electron gun 14 is controlled by circuitry 26 during writing and erasing operations. Control circuitry for modulating an electron beam so as to create a desired charge pattern is well known; therefore, no further description is given herein. During the reading operation, the electron beam generated by electron gun 12 is positioned to particular positions on information storage area 20 by circuitry 28.

Display device 30 includes an amplifier 32 and a cathode ray scope 34. The intensity of electron beam in cathode ray scope 34 is controlled by the output of detector 18 through amplifier 32. The position of the electron :am in cathode ray scope 34 is controlled by circuitry ;. The electron beam in cathode ray scope 34 moves :ross the face thereof in synchronization with the movement of electron beam 13 across information storage area ). During the read operation electron beam 13 scans rget area 20 and the electron beam in cathode ray ope 34 scans the face thereof similar to the manner that ie face of a television tube is scanned. Herein, for con-enience of illustration, target area 20 and the face of ithode ray scope 34 are shown as being substantially ie same size. It should be understood that in practice tar-et area 20 could be substantially smaller than the face f cathode ray scope 34. The velocity of electron beam 3 should be relatively high during the reading operation ) that it can be focused to obtain high resolution; how-ver, the velocity should not be so high that the surface )pology does not affect the amount of backscattering. 'or example, the reading gun could have an accelerating otential of ten thousand volts.

Scan control circuitry 28 which synchronously controls ie movement of electron beam 13 and the movement of ie electron beam in scope 34 is conventional and will ot be described further. Likewise, amplifier 32 and cath-de ray scope 34 are conventional components known in ie art; therefore, no further description thereof is given.

The details of detector 18 are shown in FIGURE 3. It icludes a layer of scintillating material 41, a light pipe 2 and a photomultiplier 43. A relatively small stream f electrons incident upon scintillating material 41 gen-rate a substantial electrical signal at the output of photo-nultiplier 43. Other detectors such as the solar cells made y The Hoffman Semiconductor Division or the diode de-ector SD100 made by Edgerton, Germeshauser and Grier, nc., could also be used.

Thermoplastic material 22 may consist of polystyrene or the copolymers thereof. Other suitable thermoplastic naterials are known in the art. The layer of thermoplastic naterial may be in the range of ten to twenty microns hick.

Conductive film 21 may consist of a vacuum deposited gold film 500 angstroms thick. Insulating substrate 23 nay consist of a layer of Mylar (trade name) ten to wenty microns thick.

The current necessary to heat layers 21 and 22 during the writing operation can be supplied by power source 41 and switch 42. Closing switch 42 directs current through film 21 which will heat both layers 21 and 22. The amount of heat which must be applied can be determined by continuously performing a read operation simultaneously with the development step (i.e., the heating step) of the write operation. When an image of sufficient clarity appears on output device 30, it indicates that sufficient heat has been applied. If excessive heat is applied, the image which appears on output device 30 will being to deteriorate.

As shown herein, two electron guns are used. An alternate embodiment could be constructed using only one electron gun for both reading and writing. In this case, means would have to be provided to physically change the relative position between the electron gun and the target area between read and write operations. That is, between reading and writing operations, the target area would have to be rotated 180 degrees relative to the single electron gun.

As shown herein the output signal is in the form of a visual image of the record surface as provided on the face of cathode ray scope 34. Alternately the signal generated by detector 18 could be used as a binary type signal for input to a computer. Scan control circuitry 26 could move the electron beam across a specific area of the record area 20 and the signal appearing at the output of detector 18 during this time could be an indication of whether or not a digit is stored at this location. Whether or not a digit is stored is indicated on record area 20 by whether or not there is a depression at this location.

The term thermoplastic as used herein refers to any material which can be softened to a pliable state by the application of heat and which can be repeatedly cycled through the solid and pliable states. The term backscattered electrons as used herein refers to secondarily emitted electrons and/or electrons which are actually backscattered from the incident beam. Stated differently the term backscattered electrons refers to all electrons which leave the surface of earea 20 irrespective of their energy. Naturally detector 18 only responds to electrons in a certain energy band. A greater output signal is obtained by having a detector which responds to both secondarily emitter electrons and those which are actually backscattered from the incident beam. However, if in order to obtain a very high resolution a very high energy beam is used for reading, then the band of energies between the secondarily emitter electrons and the electrons which are actually backscattered from the incident beam will be larger than the range of available detectors. In this case either a plurality of detectors having different ranges could be used or the system could use one detector in a particular range, preferably in the range of the secondarily emitted electrons. The secondarily emitted electrons above do contain the necessary information.

While the invention has been particularly shown and described with reference to preferred embodiment thereof, it will be understood by those skilled in the art that the foregoing and other changes in the form and details may be made therein without departing from the spirit and scope of the invention.

What is claimed is:

1. An information storage system wherein information is stored in the form of a deformation pattern comprising:
   - an insulating member;
   - a thermoplastic layer disposed on said insulating member;
   - a thin coating of electrically conductive material on said thermoplastic layer;
   - means for depositing an electrostatic charge pattern on said insulating member in accordance with the information to be stored;
   - means for heating said thin conductive layer and said thermoplastic layer whereby said conductive layer and said thermoplastic layer deform in accordance with the electrostatic charge pattern on said insulating member; and
   - readout means including means for directing an electron beam at said thin conductive layer, and
   - means for detecting the number of electrons backscattered from said thin conductive layer, thereby detecting the deformation of said conductive layer and the information represented thereby.

2. An information storage system wherein information is stored in the form of a deformation pattern comprising:
   - an insulating member;
   - a thermoplastic layer disposed on said insulating member;
   - a thin coating of electrically conductive material on said thermoplastic layer;
   - means for depositing an electrostatic charge pattern on said insulating member in accordance with the information to be stored;
   - means for passing current through said thin conductive layer to heat said thin conductive layer and said thermoplastic layer whereby said conductive layer and said thermoplastic layer deform in accordance with the electrostatic charge pattern on said insulating member;
   - readout means including means for directing an electron beam at said thin conductive layer; and
   - means for detecting the number of electrons backscattered from said thin conductive layer, thereby detecting the deformation of said conductive layer and the information represented thereby.

3. An information storage system wherein information is stored in the form of a deformation pattern comprising:

an insulating member;

a thermoplastic layer disposed on said insulating member;

a deformable coating of electrically conductive material on said thermoplastic layer;

means for depositing an electrostatic charge pattern on said insulating member in accordance with the information to be stored;

means for passing current through said conductive layer to heat said conductive layer and said thermoplastic layer whereby said conductive layer and said thermoplastic layer deform in accordance with the electrostatic charge pattern on said insulating member;

readout means including means for directing an electron beam at said conductive layer; and means for detecting the number of electrons backscattered from said conductive layer, thereby detecting the deformation of said conductive layer and the information represented thereby.

4. An information storage system wherein information is stored in the form of a deformation pattern comprising:

an insulating member;

a thermoplastic layer disposed on said insulating member;

a thin coating of electrically conductive material on said thermoplastic layer;

means for depositing an electrostatic charge pattern on said insulating member in accordance with the information to be stored;

means for passing current through said thin conductive layer to heat said thin conductive layer and said thermoplastic layer whereby said conductive layer and said thermoplastic layer deform in accordance with the electrostatic charge pattern on said insulating member; and read out means including means for directing a first electron beam at said thin conductive layer;

means for controlling the position of said first electron beam on said conductive layer;

detecting means for generating a signal indicative of the number of electrons backscattered from said thin conductive layer;

a cathode ray scope having an electron beam;

means for moving the beam in said cathode ray scope in synchronization with said first electron beam; and means for modulating the electron beam in said cathode ray scope in accordance with the signal generated by said detecting means, whereby an image is generated on the face of said cathode ray scope which indicates the deformation of said conductive layer and thereby indicates the stored information.

5. An information storage system wherein information is stored in the form of a deformation pattern comprising:

an insulating member;

a thermoplastic layer disposed on said insulating member;

a thin coating of electrically conductive material on said thermoplastic layer;

means for depositing an electrostatic charge pattern on said insulating member in accordance with the information to be stored;

means for heating said thin conductive layer and said thermoplasitc layer whereby said conductive layer and said thin thermoplastic layer deform in accordance with the electrostatic charge pattern on said insulating member; and read out means including means for directing a first electron beam at said thin conductive layer;

means for controlling the position of said first electron beam on said conductive layer;

detecting means for generating a signal indicative of the number of electrons backscattered from said thin conductive layer;

a cathode ray scope having an electron beam;

means for moving the beam in said cathode ray scop in synchronization with said first electron beam;

means for modulating the electron beam in said cathod ray scope in accordance with the signal generated b said detecting means, whereby an image is generated on the face of said cath ode ray scope which indicates the deformation of sai conductive layer and thereby indicates the store information.

6. An information storage system wherein informatio is stored in the form of a deformation pattern comprising an insulating member;

a thermoplastic layer disposed on said insulating mem ber;

a thin coating of electrically conductive material on saic thermoplastic layer;

means for disposing an electrostatic charge pattern or said insulating member in accordance with the infor mation to be stored;

means for heating said conductive layer and said thermoplastic layer whereby said conductive layer and said thermoplastic layer deform in accordance with the electrostatic charge pattern on said insulating member; and means disposed adjacent to said thin conductive layer for reading out the information represented by the deformation of said conductive layer.

7. An information storage system wherein information is stored in the form of a deformation pattern comprising:

an insulating member;

a thermoplastic layer disposed on said insulating member;

a thin coating of electrically conductive material on said thermoplastic layer;

means for depositing an electrostatic charge pattern on said insulating member in accordance with the information to be stored;

means for passing current through said thin conductive layer to heat said conductive layer and said thermoplastic layer whereby said conductive layer and said thermoplastic layer deform in accordance with the electrostatic charge pattern on said insulating member; and means disposed adjacent to said thin conductive layer for reading out the information represented by the deformation of said conductive layer.

8. An information storage system wherein information is stored in the form of a deformation pattern comprising:

a layer of thermoplastic material, having first and second sides;

a thin coating of electrically conductive material on the first side of said thermoplastic layer;

means for depositing an electrostatic charge pattern on the second side of said thermoplastic layer in accordance with the information to be stored;

means for passing current through said thin conductive layer to heat said conductive layer and said thermoplastic layer whereby said conductive layer and said thermoplastic layer deform in accordance with said electrostatic charge pattern; and means disposed adjacent to said thin conductive layer for reading out the information represented by the deformation of said conductive layer.

9. An information storage system wherein information is stored in the form of a deformation pattern comprising:

a thermoplastic layer having first and second sides;

a thin coating of electrically conductive material on the first side of said thermoplastic layer;

means for depositing an electrostatic charge pattern on the second side of said thermoplastic layer in accordance with the information to be stored;

means for heating said thin conductive layer and said thermoplastic layer whereby said conductive layer and said thermoplastic layer deform in accordance with the electrostatic charge pattern on said insulating member; and read out means including means for directing an electron beam at said thin conductive layer; and means for detecting the number of electrons backscattered from said thin conductive layer, thereby detecting the deformation of said conductive layer and the information represented thereby.

References Cited

UNITED STATES PATENTS

| | | | |
|---|---|---|---|
| 3,130,341 | 4/1964 | Johnson | 313—89 |
| 3,158,430 | 11/1964 | McNaney | 340—173 |
| 3,247,493 | 4/1966 | Wolfe et al. | 340—173 |

BERNARD KONICK, *Primary Examiner.*

J. BREIMAYER, *Assistant Examiner.*